Dec. 23, 1969 D. J. BAKER 3,485,501

PHONOGRAPH TONE ARM ASSEMBLY

Filed Oct. 19, 1965 3 Sheets-Sheet 1

INVENTOR.
DONALD J. BAKER

BY

ATTORNEY

PHONOGRAPH TONE ARM ASSEMBLY

Filed Oct. 19, 1965 3 Sheets-Sheet 2

INVENTOR.
DONALD J. BAKER
BY [signature]
ATTORNEY

PHONOGRAPH TONE ARM ASSEMBLY

Filed Oct. 19, 1965 3 Sheets-Sheet 3

INVENTOR.
DONALD J. BAKER
BY
B. N. [signature]
ATTORNEY

United States Patent Office 3,485,501
Patented Dec. 23, 1969

3,485,501

PHONOGRAPH TONE ARM ASSEMBLY

Donald J. Baker, 516 Coolidge Drive, San Gabriel, Calif. 91775; Ruura E. Baker, widow of said Donald J. Baker, deceased Filed Oct. 19, 1965, Ser. No. 497,621
Int. Cl. G11b 3/32
U.S. Cl. 274—23 18 Claims

ABSTRACT OF THE DISCLOSURE

This high precision tone arm assembly features a four bar linkage having a stationary link supporting a stylus-equipped tone arm through a cantilever link and a swing control link and cooperating with one another to advance the stylus continuously along the sound track in very small increments while maintaining the plane of oscillation of the stylus tip continuously in a radial plane passing through the turntable axis. A spring servo-motor operates on the tone arm assembly to urge the stylus always forwardly along the sound track and toward the turntable axis in very small increments and with a force adequate to compensate for friction losses occurring between relatively moving components of the tone arm assembly. An adjustable counterbalance for the stylus support arm is mounted entirely on this arm and includes a calibrated scale for indicating the stylus pressure in each adjusted position of the counterbalance.

This invention relates to phonographs and more particularly to an improved high fidelity tone arm assembly so constructed and arranged as to maintain the stylus tip in contact with the sound track at the point of tangency and embodying numerous novel features.

It is well known that the high fidelity distortionless conversion of the sound track represented by the groove trace on the face of a phonograph record into electrical signals is critically dependent on the tip of the transducer stylus being in contact with the sound track at the point of tangency at all times and throughout the length of the sound track. Any deviation from the point of tangency is known to introduce an error in the electrical signal and the fidelity of the reproduction.

Numerous attempts have been made by designers to provide a tone arm assembly to support the stylus tip precisely at the point of tangency at all times, but prior to the present invention these attempts have merely been successful in attaining varying degrees of approach to the known ideal of true tangency. A standard type of rigid tone arm has a length of 8 inches between its fixed pivot axis and the tip of the stylus. Such an arm is usually so mounted closely beside the turntable that the maximum departure of the stylus from true tangency does not exceed plus or minus 3 degrees while traversing the full length of the sound track and it is only tangent in a single position on the record. This error or deviation from tangency can be reduced by lengthening the tone arm, but to do so introduces new and troublesome problems, particularly when an attempt is made to reduce the unbalanced weight tending to hold the stylus seated in the sound track groove.

Other attempts to reduce migration from true tangency include various tone arm supporting linkages designed with a view to advancing the needle crosswise of the record face in a closer approximation to uniform tangency with the sound track. However, as is widely recognized, such tone arm linkages have been successful only as respects the degree of approach to tangency and the proportion of time during which the stylus tip is in or very close to true tangency.

Other unique features characterizing the present invention include the following among others. For example, in the invention tone arm assembly, substantially all friction losses between the various relatively moving components are reduced to a bare minimum and those that remain are virtually eliminated by means substantially fully compensating for these minimal losses. Another feature is the use of rigid material for the components having negligible resonating response to vibrations created in the transducer and supplemented by the action of soft, vibration-absorbing material interposed between the transducer proper and the means holding it anchored to the nonresonating tone arm structure.

Another important feature is the unique provision for supporting the stylus in contact with the groove with accurately determined pressure of the particular amount desired and normally of a far smaller value than practicably feasible heretofore. This is achieved in this invention by utilizing a substantially friction-free supporting linkage in combination with a relatively short counterbalanced transducer-carrying arm having a pivot connection with the outer end of the tone arm proper. The adjustable counterweight is formed in two parts, one of which is adjustable to counterbalance the transducer carrier and the other of which is then adjustable to cause the stylus to bear against the sound track with a predetermined pressure, as one gram.

Another feature is the provision of manually regulatable means for delicately adjusting the power drive for the tone arm assembly to the particular amount required to compensate for the friction losses of the several antifriction bearing assemblies.

Accordingly, it is a primary object of the present invention to provide a unique tone arm assembly for a phonograph arranged and designed to maintain the stylus tip in contact with the sound track at the point of tangency throughout the length of the sound track.

Another object of the invention is the provision of a high fidelity tone arm assembly characterized in supporting the transducer in a counterbalanced mounting assembly pivoted to the outer end of the tone arm.

Another object of the invention is the provision of a high fidelity tone arm assembly made up of multiple rigid components pivotally connected to one another through precision antifriction bearings.

Another object of the invention is the provision of a tone arm assembly composed of multiple links pivotally interconnected at precise points and including a fixed link the center line of which is arranged at a precise angle with respect to the center line through the turntable axis and one pivot point of the fixed arm.

Another object of the invention is the provision of an improved tone arm assembly having a counterbalanced transducer carrier pivoted to the outer end of the tone arm on a transverse axis and including high precision means for regulating the pressure between the stylus tip and the sound track.

Another object of the invention is the provision of a tone arm assembly having a plurality of members pivotally connected to one another through antifriction bearings and including precision spring motor means for driving the linkage with a force corresponding generally with the friction losses of said bearing assemblies and correlated with the drag of the stylus on the rotating record.

Another object of the invention is the provision of servo spring motor means coupled to a tone arm assembly for a phonograph turntable and cooperating with the rotational drag imposed on the stylus as the record rotates to move the stylus forward along the sound track groove by a slight increment during each revolution of the record while maintaining the stylus tip centrally of the groove at the point of tangency and in a generally upright position.

Another object of the invention is the provision of a tone arm assembly comprising a four-bar linkage arranged to maintain the stylus tip tangent to the sound groove at all times and as the effective distance between the stylus tip and the pivot axis for the tone arm assembly increases during reproduction of a sound track.

Another object of the invention is the provision of a tone arm assembly for a phonograph so arranged that there is substantially no drag between the stylus tip and the sound track groove thereby avoiding distortion in the transducer output signal or wear on the sound track groove.

Another object of the invention is the provision of mounting means for a sound transducer at the outer end of a tone arm assembly including means for positioning the tip of the stylus precisely preliminary to tightening of the mounting clamp components.

Still another object is the provision of permanent magnet means for holding the tone arm linkage normally in a retracted position.

Another object of the invention is the provision of a tone arm assembly made of rigid components having minimum resonance characteristics.

Another object of the invention is the provision of a clamping mount assembly for a sound transducer having resilient vibration-absorbing material interposed between the rigid tone arm and the transducer proper to isolate and prevent transmission of vibrations from the transducer to the tone arm.

Another object of the invention is the provision of a tone arm assembly formed of multiple rigid arms pivotally connected to one another and each pair of which have precise length ratios relative to one another.

These and other more specific objects will appear upon reading the following specification and claims and upon considering in connection therewith the attached drawings to which they relate.

Referring now to the drawings in which a preferred embodiment of the invention is illustrated.

Figures 1, 9:
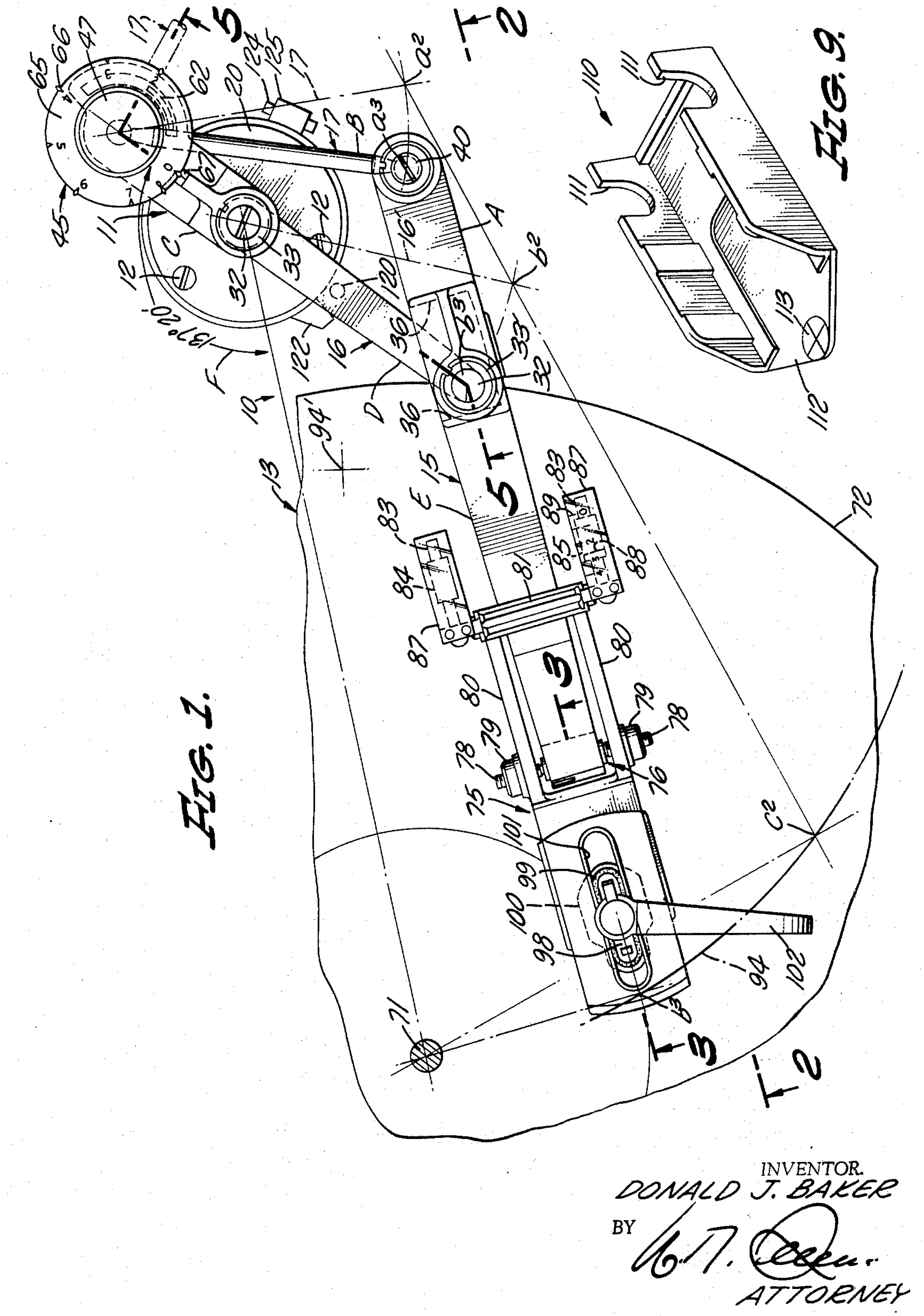
FIGURE 1 is a fragmentary plan view of a preferred embodiment of the tone arm assembly showing the position of the parts as the stylus reaches the end of the sound track.
FIGURE 9 is a perspective view of gage means for use in locating the proper operating position of the transducer stylus before clamping the transducer in the tone arm.

Referring initially more particularly to FIGURES 1 through 4, it is pointed out that the tone arm assembly designated generally 10 embodying the present invention comprises a fixed bracket arm 11 rigidly anchored, as by screws 12, to the main body of a phonograph closely adjacent one side of turntable 13. The tone arm proper 15 is supported for bodily planar movement at the outer end of a cantilever arm 16, and the path of movement of tone arm 15 is determined by the conjoint action of arm 15 and a control link 17. In this connection, it will be understood that arms 16 and 17 have one adjacent pair of ends pivotally connected to the opposite ends of fixed arm 11 and their other ends pivotally connected to the inner or right-hand end of tone arm 15, as viewed in FIGURE 1.

Figure 2:
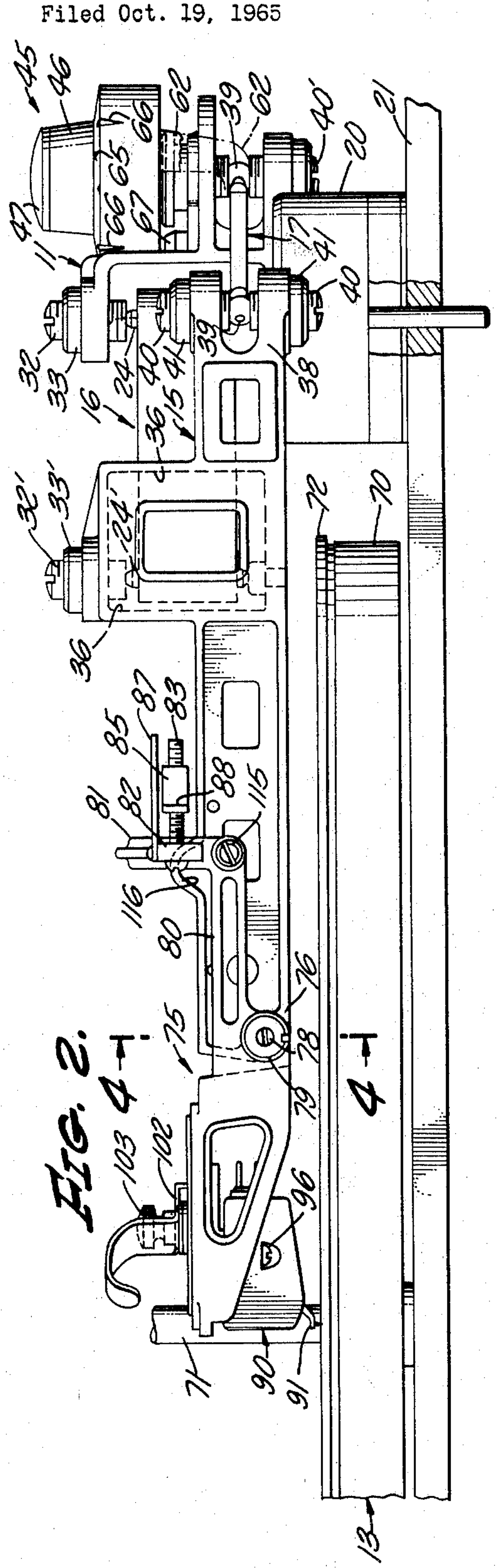
FIGURE 2 is a side elevational view taken along line 2—2 on FIGURE 1.
Figure 5:
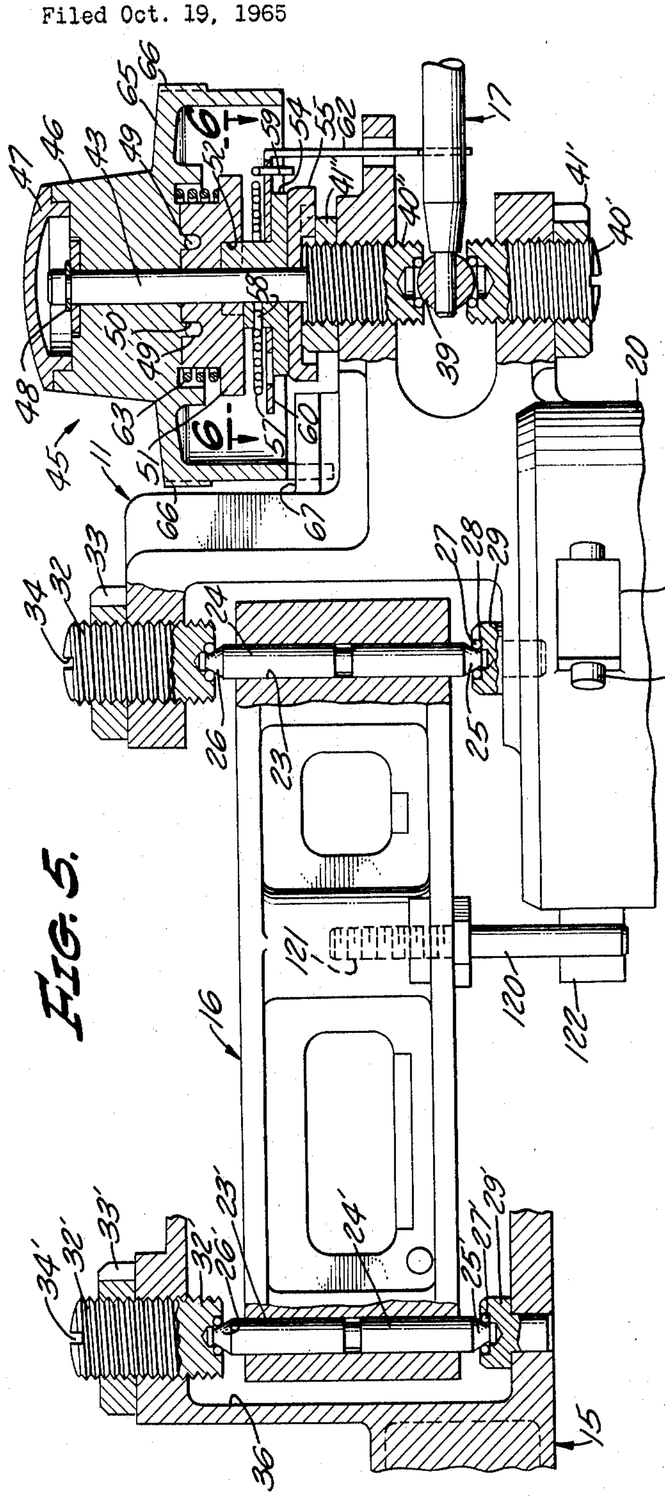
FIGURE 5 is a fragmentary view taken along the broken line 5—5 on FIGURE 1 with parts in section and showing details of the torsion spring adjustment and of the cantilever suspension for the tone arm proper.

Referring now to FIGURES 2 and 5 and particularly to the latter, it will be observed that bracket arm 11 has a circular base 20 secured to the top 21 of the phonograph by the mounting screws 12, 12 (FIGURE 1). The opposite ends of bracket arm 11 are bifurcated as best shown in FIGURE 5, and each is provided with high precision pivot bearing assemblies to which the adjacent ends of the pivoting arms 16 and 17 are connected. Considering first the pivot assembly for arm 16, it will be understood that a vertical bore 23 through this arm frictionally supports a double-ended pintle 24 having precision conical surfaces, 25, 26 at its opposite ends. Lower surface 25 nests against a ring of ball bearings 27 seated in a shouldered channel 28 opening axially from the upper end of the bearing member 29 pressed into the top of base member 20. The upper conical surface 26 of pintle 24 is similarly seated against a ring of antifriction bearings in a seat formed in the lower end of an adjustable screw 32 locked in any adjusted position by jam nut 33. A kerf 34 at the outer end of screw 32 facilitates adjustment of the bearing assembly to the end that arm 16 will swing effortlessly and without lost motion as respects the bearings at either end of pintle 24.

The opposite or outer end of the pivoting support arm 16 is similarly pivotally connected to an intermediate portion of tone arm 15. Referring to FIGURE 1, it is pointed out that this tone arm has a laterally opening cut-out 36 along one side. The outer end of arm 16 extends into this cut-out and carries a vertical pintle pin 24' having its opposite ends held captive in antifriction bearing assemblies identical with those just described for the inner end of the arm, the same or similar components being designated by the same reference characters but distinguished by the addition of a prime.

Control arm or link 17 has its outer or right-hand end, as viewed in FIGURE 2, pivotally socketed in the bifurcated inner end 38 of tone arm 15. The opposite ends of the control arm are provided with a precision sphere which is silver soldered or otherwise secured to the reduced ends of control arm 17. Before the second one of the spheres is soldered in place, its position lengthwise of the rod and from the center of the other sphere is determined very precisely by a suitable jig or other means. Outer sphere 39 is then seated between upper or lower sets of ball bearings similar to balls 27 described above and held seated in shouldered wells formed at the inner ends of the bearing support screws 40, 40. These screws are aligned with one another in the bifurcated end 38 of the tone arm and are locked in adjusted position by jam nuts 41.

The sphere 39 at the inner end of rod 17 is socketed between a similar pair of screws 40', 40'' in axial alignment with one another at the bifurcated outer end of bracket arm 11. Screw 40'' differs in having an upwardly projecting shank 43 serving as a mounting support for a servo spring motor device, designated generally 45, employed to counterbalance friction losses in the various pivot assemblies for the tone arm assembly and having important functions to be described in detail below and including urging the tone arm assembly forward in minute increments lengthwise of the sound track groove as the record rotates while continually maintaining the stylus tip in contact with the record at the point of tangency.

The adjusable friction loss compensating motor 45 includes a manually adjusted control knob 46 having a removable cap 47 concealing a keeper spring 48 holding the knob assembled to shank 43. The hollow underside of knob 46 has one or more pins 49 selectively seatable in a ring of complementally shaped wells 50 and having a purpose to be explained presently.

Figure 6:
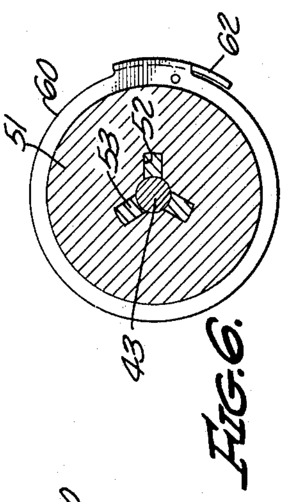
FIGURE 6 is a cross-sectional view taken along line 6—6 on FIGURE 5.

A ring of wells 50 is formed in a collar member 51 mounted loosely about shank 43 and having splined slots 52 seating splines 53 (FIGURE 6) projecting thereinto from a rotating clutch plate 54. Clutch plate 54 has frictional contact with a cooperating stationary clutch plate 55 bearing against and keyed to jam nut 41'. Wells 50 seat one or more cooperating pins 49 carried by knob 46 and are used to permit relative rotary assembly of the knob and collar member 51 at the desired "zero" position.

The energy for the friction loss compensating motor is provided by a long, spirally wound spring 57 the inner end 58 of which is anchored to clutch plate 54 and the downturned outer end 59 of which projects downwardly through an opening in a disc 60 loosely journalled about the hub of clutch plate 54. Disc 60 has a downturned tang 62 which presses against one side of some part of the tone arm linkage, as control link 17, so as to urge the tone arm linkage generally to pivot clockwise about the upper end of this link, as viewed in FIGURE 1. It will be apparent from FIGURE 1 that tang 62 bears against the tone arm linkage closely adjacent one end of the fixed bracket 11. For this reason its effective lever arm is short in comparison with the relatively great distance between the stylus tip and the pivot for the tone arm linkage. Accordingly it is feasible to use a very light duty spring motor 57 to drive the tone arm even though the stylus pressure on the record is only in the order of 1 to 2 grams. It is also pointed out that the full movement of tang 62 is only through a short arc with the result that the effective power supplied by motor spring 57 is constant for all practical purposes.

A compression spring 63 surrounds the hub of collar 51 and has one end bearing downwardly against this collar and its upper end bearing upwardly against the underside of control knob 46. This spring causes collar 51 to press downwardly against the upper end of splines 53 of the rotating clutch plate 54 thereby creating sufficient friction between clutch plates 54 and 55 to hold the inner or anchored end of the friction compensating torsion spring 57 in any adjusted position. In other words, the stress stored within torsion spring 57 can be increased or decreased by rotating knob 46 to adjust the position of its inner end 58 either clockwise or counterclockwise relative to its outer end 59. The rotation of knob 46 will therefore be recognized as effective to cause tang 62 to bear against control rod 17 with a slightly greater or a slightly smaller force, thereby to vary the friction compensating characteristics of device 46 on the tone arm assembly.

Referring now to FIGURE 1, it will be understood that the radial flange 65 about the face of knob 46 is preferebaly calibrated as indicated by indicia numerals 1 to 8, or any other suitable indicia, each associated with one of ribs 66 on the rim of the dial. These ribs are rotatable past a fixed zero indicator marker 67 (FIGURES 1, 2, 5) to aid the operator in judging how much he is changing the effective tension on spring 57.

Figures 3, 4:
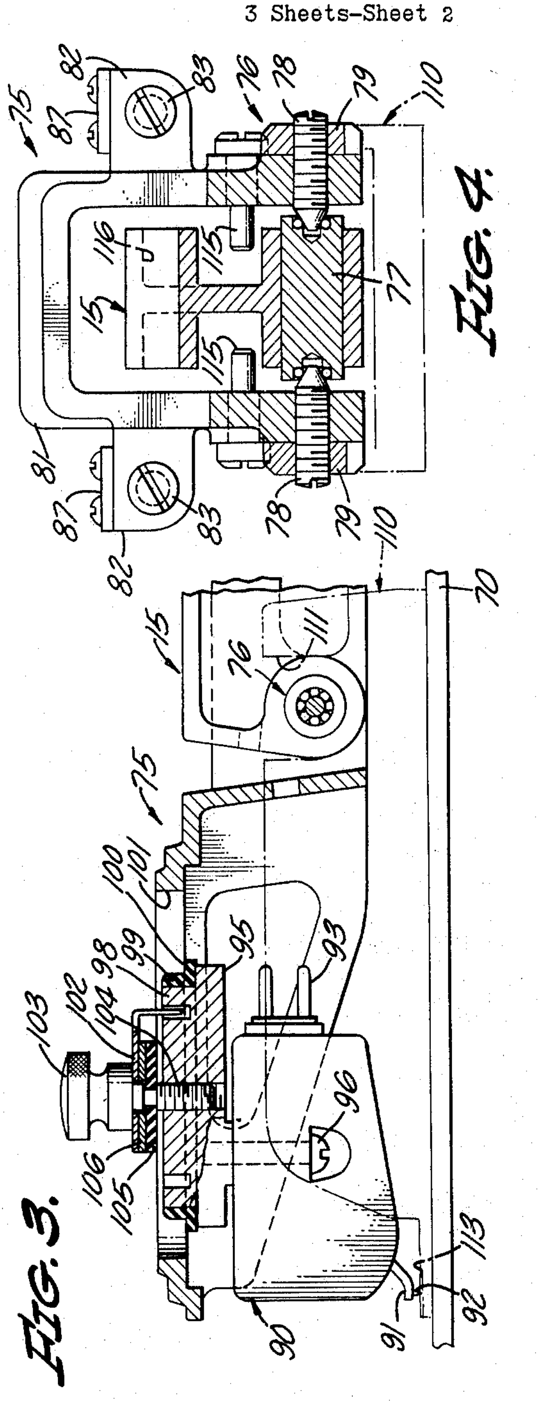
FIGURE 3 is a fragmentary vertical sectional view of the stylus end of the assembly taken along line 3—3 on FIGURE 1.
FIGURE 4 is a cross-sectional view on an enlarged scale taken along line 4—4 on FIGURE 2.

Referring now more particularly to FIGURES 1, 2 and 3, it will be understood that the outer end of the tone arm is positioned to move transversely across turntable 13 rotating about its drive spindle which serves additionally as the record centering pin 71. A typical record 72 is shown mounted on the turntable.

The combined transducer mount and counterbalance assembly designated generally 75 is pivotally supported transversely of tone arm 15 on an antifriction pivot assembly 76 (FIGURE 2). Carrier 75, as arm 15, is made of suitable rigid material having minimal resonating properties such as cast magnesium. The antifriction bearing assembly 76 holding the counterbalance pivotally supported to the outer end of the tone arm is best shown in FIGURE 4 and includes bearing seat member 77 having a press fit in a bore extending transversely of the tone arm and its opposite ends being provided with shouldered bores seating sets of ball bearings. The conical inner ends of bearing screws 78 rotate on these sets of ball bearings and are locked in adjusted position by jam nuts 79.

A pair of counterbalance supporting arms 80, 80 extend rearwardly from bearing assembly 76 and their outer ends are interconnected by an arch member 81 embracing tone arm 15. Projecting outwardly from the opposite legs of arch 81 are tangs 82 having threaded openings seating long screws 83. Separate counterbalance sleeves 84, 85 (FIGURE 1), provided with threaded bores, are rotatable on the threads of screws 83. A slab of transparent plastic material 87 overlies each of the adjustable counterweights 84, 85 and one or both are provided with suitable indicia cooperating with a zero indicator marker 88 (FIGURE 2) encircling the counterweights. Actually, however, only the shelf overlying outer counterweight 85 need be provided with indicia since this is the counterweight normally employed for vernier adjustment purposes.

Referring now to the transducer end of carrier 75 and more particularly to FIGURES 2 and 3, it is pointed out that any suitable transducer cartridge 90 may be clamped to the carrier. Such transducers include a stylus 91 having a tip 92 positioned to seat in the sound track groove of record 72. The transducer also includes either two or four terminal prongs 93 mateable with the female receptors of a connector plug, not shown, and having wires extending along the tone arm but not shown herein.

The clamping means for holding transducer 90 precisely and accurately clamped in carrier 75 comprises a mounting adaptor 95 provided with threaded openings in which mounting screws 96 seat to hold the transducer clamped against the lower surface of the adaptor. Seating about the rim of an elongated boss 98 projecting upwardly from adaptor 95 is a resilient gasket member of molded soft rubber or the like 99 having a wide radial flange 100 projecting from its base. Boss 98 and the surrounding portion 99 of the gasket fits snugly upwardly within an elongated slot 101 formed lengthwise of carrier 75. A clamping thumbnut 103 has a threaded shank 104 mating with a threaded opening in adaptor 95 (FIGURE 3) and also serves to hold a very resilient lifting finger piece 102 in assembled position and used in manually shifting the tone arm from and to playing position. The resiliency of finger piece 102 gives the user a positive sense of the delicacy of a high grade precision instrument and provides a safeguard against injury by too vigorous contact of pins 115 with either set of cooperating stop surfaces. Held captive in a groove at the base end of shank 104 is a rubber washer 105 underlying a back-up washer 106. While thumbnut 103 is loose, it will be understood that the transducer and its components can be moved bodily lengthwise of slot 101 until tip 92 of stylus 91 is precisely at the desired distance from the designated one of the pivot connections forming part of the tone arm assembly. In this connection, it is pointed out that transducers of different manufacture employ stylus members of different construction and positioned differently with respect to the mounting screws for the transducer. The present transducer mounting and clamping assembly permits the operator to employ a transducer of any manufacture and to position the stylus tip precisely at the same distance from the axis of the pivot connection between arms 15 and 16.

To facilitate locating the stylus tip precisely in the proper position, the present invention provides a locator or gage, such as that illustrated by way of example in FIGURE 9, and there designated generally 110. This gage member is formed of any suitable rigid material and is preferably channel-shaped and provided with aligned notches 111 at one end of its side flanges. These notches are accurately dimensioned to fit snugly under the rims of jam nut 79 for the transverse bearings holding carrier 75 to tone arm 15. In this connection, note that gage member 110 is shown in phantom lines in FIGURE 3 and assembled upwardly against the underside of the tone arm with notches 111 fitting about jam nuts 79.

The web portion 112 of the gage device is provided at the end thereof remote from notches 111 with a pair of lines crossing each other at right angles, the point of crossover 113 being the precise point stylus tip 92 should contact when the transducer is properly positioned along slot 101. Having visually determined that the stylus is so positioned, the operator proceeds to tighten thumbnut 103 while checking to make certain that the assembly remains immovable in slot 101 as tightening proceeds. Once the thumbnut has been firmly tightened in the proper position, gage 110 may be removed.

However, if preferred, it will be understood that a modified type gage device can be permanently attached to the underside of carrier 75 by a cap screw or the like. Normally, this gage member will be retained in retracted position beneath one of the counterweight side arms 80. When needed to locate clamping position of the transducer, this member may be pivoted 180 degrees so that locator indicia thereon will underlie the stylus when the latter is properly located lengthwise of lot 101.

It is important to limit the pivotal movement of carrier 75 about the axis of bearing assembly 76, a function accomplished by a pair of stop pins 115 projecting inwardly from the counterbalance arms 80, 80 (FIGURES 2 and 4). Clockwise movement of the carrier is limited as these stop pins strike the lower flanges of tone arm 15 and counterclockwise pivotal movement is limited as the stop pins engage a hump 116 formed in the flanges extending along the upper edge of the tone arm. It will be understood that when the tone arm is not in playing position it will be positioned outwardly to one side of the turntable rim stop pins 115 of transducer carrier 75 resting against hump 116. Accordingly, no rest is necessary or normally provided for the tone arm assembly other than the main supporting bracket arm 11.

Referring now to FIGURE 2, it will be understood that projecting downwardly from the underside of the cantilever support arm 16 is a stop pin 120 of magnetic material having a threaded shank seated in a bore of arm 16. Cooperating with this pin is a stationary stop 122 projecting laterally from the supporting boss 20 for the stationary bracket arm 11. Stop 122 is positioned to limit the inward travel of the tone arm at the end of the smallest diameter sound track. A second stop for the tone arm assembly comprises a permanent magnet member 124 mounted in a boss 125 projecting from the side of base 20 (FIGURE 5) supporting the tone arm linkage. Magnet 124 is positioned to contact stop 120 when the tone arm 15 is swung outwardly away from the rim of the turntable. The magnet is sufficiently strong to hold pin 120 and the tone arm firmly in retracted position until forcibly detached from the magnet.

The relative lengths of the several arms of the four-bar tone arm linkage and the disposition of fixed bracket arm 11 to the axis of the turntable are important to this invention. To facilitate discussion of these, bracket arm 11 is designated C, cantilever arm 16 is identified by D, control link 17 by B, the portion of the tone arm between the pivot connections to arms B and D is identified by A, and the portion of the tone arm between the stylus tip 92 and the axis of the pivot connection to arm D is identified by E. In addition the distance between the axis of the turntable and the axis of the junction between arms C and D is important and 7.593 inches when the several arms have the values set forth below.

With the foregoing in mind, it is pointed out that the lengths of the various arms between their pivot axes typically are as follows:

| | Inches |
|---|---|
| Arm A | 2.000 |
| Arm B | 2.625 |
| Arm C | 1.385 |
| Arm D | 2.500 |
| Arm E | 5.625 |

If arms having these dimensions are used, then the ratios of the lengths of arm A to the length of the several other arms are as follows:

Ratio of A to B=0.7619
Ratio of A to C=1.4440
Ratio of A to D=0.8000
Ratio of A to E=0.3555

Using these ratios, a tone arm of any desired size can be designed.

In addition, the angle between the longitudinal center line of arm B and a line passing through the axis of the turntable spindle and the pivot axis between arms A and B is important. This angle is indicated by arc F on FIGURE 1 and measures 137 degrees and 20 minutes, plus or minus 5 minutes.

The operation of the described assembly will be apparent from the foregoing detailed description of its components. Before placing the apparatus in operation, it is well to check the setting of the servo and friction loss-compensating spring motor assembly 45. This operation is performed by placing the stylus at the starting end of the sound track of a record mounted on turntable 13 while the latter is rotating. The counterweights are then adjusted until the stylus bears against the sound track with the desired pressure, and usually ½ to 2 grams.

Adjusting the counterweights for the pivoting stylus supporting arm 80 is done by rotating counterweight 84 to a position near the outer end of screw 83 and counterweight 85 outwardly until line 88 encircling the counterweight is opposite the zero reading of the vernier scale 89 (FIGURE 1). The stylus is now placed in the sound track groove and counterweight 84 is adjusted to the right along screw 83 until the stylus tip rises away from the groove. The transducer carrier 75 is then exactly balanced and vernier counterweight 85 can now be adjusted to the right along screw 83 until indicator line 88 on the counterweight is opposite the particular reading on scale 89 representing the particular pressure desired on the stylus tip. If this is one gram, then the counterweight is shifted to the right until line 88 is directly beneath the one gram calibration on scale 89.

Figure 7:
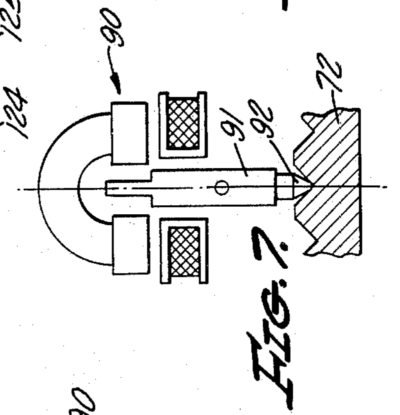
FIGURES 7 and 8 are schematic views crosswise of the sound transducer, FIGURE 7 illustrating the proper disposition of the stylus and FIGURE 8 showing an improper and nonfidelity transcribing position for the transducer.

Knob 46 is then adjusted clockwise or counterclockwise to vary the effectiveness of spring 57 and tang 62 to advance the tone arm linkage in such manner that the stylus operates in the generally upright position illustrated in FIGURE 7. It is then known that the effective force of spring 57 of the servo motor acting in concert with the forward drag of the sound track on the stylus is properly adjusted to keep the stylus in position for high fidelity reproduction of the sound track throughout the entire length of the sound track.

The tone arm is now ready for use when the stylus is placed in contact with the outer end of the sound track. Supporting arm 16 and control link 17 are pivoted further to the left than indicated by the dot-and-dash center lines 16', 17' on FIGURE 1. These particular positions correspond to the position of the stylus at intersection *c*–2 and approximately midway of the sound track area of the record. But irrespective of whether the stylus is in contact with the beginning of the sound track, its end, or any point in between its ends, its plane of vibration passes through the tip of the stylus while the tip is in contact with the point of tangency of the arm with any portion of the sound track. Furthermore, it is pointed out that this uniform tangency characteristic of the invention tone arm is true while the stylus is moving along the dot-and-dash arc 94 (FIGURE 1) from a point offset outwardly from the rim of a normal 12-inch record to a point inwardly of the inner end of the sound track which can be as close as 1½ inches to the record's rotational axis. In other words, the plane of vibration of the stylus tip crosswise of the groove lies in a plane coinciding with the radius through the point of tangency.

Figure 8:
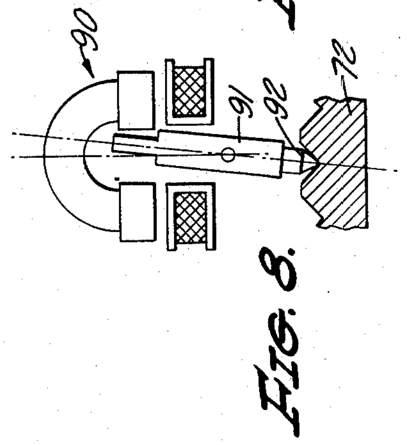

The importance of this relationship in the distortion-free, high fidelity reproduction of the sound track will be apparent from a consideration of FIGURES 7 and 8. These views are schematic representations of a transducer having the upper end of the stylus located between the poles of the magnetic transducer. For distortion-free, high fidelity reproduction, the upper end of the stylus should be midway between the two poles of the magnet when in its neutral position, a condition illustrated in FIGURE 7. When so disposed, the movement of the stylus tip in the plane of the drawing as it follows the irregularities of the sound track, represented by irregularities in the side walls of the groove, produces a corresponding movement of the upper end of the stylus between the pole faces and generates true signals in the transducer pick-up coil.

On the other hand, if the tip of the stylus is not in contact with the groove at the point of tangency, then the stylus is not free to vibrate in a plane coincident with a radial line through the tip of the stylus and the stylus is, in effect, held canted, as is illustrated in exaggerated form in FIGURE 8, and lies closer to one pole of the magnet than to the other. Distortion inevitably follows in a degree which is directly proportional to tangent error, a fact well known to persons skilled in this art.

Additionally and of importance, the canting of the stylus results in drag between the stylus tip and the groove with the drag on one side of the groove being more pronounced than on the other. This results in unavoidable wear of the groove causing additional distortion with repeated use of the record. Such wear of the groove side wall and the associated drag are adverse factors totally absent from the invention tone arm because the stylus always vibrates exactly crosswise of the groove at the point of tangency and because the almost negligible friction present between the components of the tone arm is compensated for by the spring motor 57.

In fact, substantially the only drag present is that between the record and the stylus tip as the record rotates past the stylus. This drag is utilized to aid in feeding the tone arm components forwardly through a small arc as the stylus traverses the full length of the sound track. In this connection, it will be observed from FIGURE 1 that the contact of the stylus with the beginning of the sound track is considerably to the left of the position occupied by the end of the tone arm when the stylus reaches the end of the sound track. This arcuate advance of the one arm occurs automatically during playing of the record and as arms 16 and 17 pivot clockwise about their respective anchor ends at the opposite ends of the fixed bracket arm 11 while always maintaining the stylus in contact with the groove at the point of tangency—yet the stylus is never subject to "drag" crosswise of the record. Any slight drag is applied lengthwise of the groove in the direction of record travel and aids the spring motor in maintaining the stylus at the point of true tangency.

The referred to lengthwise drag imposed on the stylus tip as the record rotates mutually cooperates with the minute energy supplied by the servo spring motor mechanism 45 to keep the stylus generally centered crosswise of the groove while advancing the stylus continuously forward along the groove in the most minute increments to maintain the stylus tip always at the point of tangency. A single revolution of the record while the stylus is seated near the rim of the record advances the stylus along the groove by one full turn plus about 1.5 mils. As the stylus approaches the end of the sound track this advance diminishes to a substantially smaller but nevertheless plus value. This continual minute advance of the stylus is made possible and assured by the described design and operating principle of the tone arm assembly. Furthermore and of particular importance is the fact that the very slight rotational drag on the stylus tip aids not only in feeding the tone arm forward along the groove but this drag force supplements and harmonizes with the minute bias provided by the servo motor spring in holding the stylus centrally of the transverse dimension of the sound track and always at the point of tangency with a precision not previously provided by any tone arm and turntable assembly.

In conclusion, it is pointed out and emphasized that arc 94 on FIGURE 1 representing the path of travel of the stylus while traversing the sound track area of the record is a true arc of a circle centered at 94'. Additionally, it will be understood that gage member 110, when used as disclosed herein, facilitates and assures that the stylus is always clamped in the tone arm with its tip end coincident with the true circle arc 94 while traveling throughout the length of the sound track.

The invention claimed is:

1. A tone arm assembly for mounting beside the rim of a photograph turntable comprising stylus-supporting arm means having means for supporting the stylus on a pivot axis extending transversely thereof, means including swinging cantilever means pivotally connected to said arm means near the mid-length thereof and supporting the arm means for movement in a plane above the turntable, said cantilever means being adapted to be disposed substantially entirely outwardly of a turntable in all playing positions of said tone arm assembly, control link means having one end pivoted to stationary means and its other end pivoted to said arm means and cooperating therewith and with said cantilever means to move said stylus along the full length of the sound track of a record on the turntable and such that the tip of the stylus oscillates in a radial plane normal to the sound track at the point of tangency as the tip of the stylus traverses the full length of the sound track, and adjustable spring means connected between fixed means and said relatively movable components of said tone arm assembly and adjusted to have a strength barely effective to counteract substantially the friction losses between the pivoting connections of said tone arm assembly.

2. A tone arm assembly as defined in claim 1 characterized in that said spring means acting in cooperation with the minute frictional impulse imparted by the rotation of the sound track past the stylus is effective to urge the stylus to move forward with the sound track and thereby cause the stylus-carrying end of said arm means to swing toward the axis of said turntable.

3. A unitary tone arm assembly for use with a phonograph turntable having a linkage wherein the distance between the tip of a stylus carried thereby and a stationary pivot axis for said tone arm assembly gradually increases in length as the stylus traverses a sound track, said linkage comprising a fixed bracket arm, a tone arm having means for securing a stylus-carrying sound transducer to the outer end thereof, a pair of arms disposed outwardly of the turnable rim and pivotally connected between the other end of said tone arm and spaced-apart points on said fixed bracket arm and cooperating to support the stylus of said sound transducer for movement in an arc overlying the turntable, manually adjustable spring means between relatively movable arms of said tone arm assembly operable to urge said tone arm to move inwardly toward the center of the turntable with a force barely effective to counteract friction losses in said tone arm assembly as the distance between the stylus tip and said stationary pivot axis gradually increases, said adjustable spring means including friction clutch means including a fixed member and a movable member, long torsion spring means having one end bearing against one of said pairs of arms of said tone arm assembly and its other end anchored to the movable member of said clutch means, and means for adjusting the movable member of said clutch means to vary the tension on said torsion spring means.

4. A tone arm assembly as defined in claim 3 characterized in that said tone arm is formed of a rigid material having poor resonance characteristics.

5. A tone arm assembly as defined in claim 3 characterized in that one of said pair of arms comprises a rod having spherical ends pivotally connected to said tone arm and to said fixed bracket arm through ringlets of ball bearings in rolling contact with said spherical ends.

6. A tone arm assembly as defined in claim 5 characterized in that the other one of said pair of arms comprises a cantilever suspension means for supporting said tone arm for bodily movement in an arc through a planar path while maintaining said stylus in contact with a record sound track at the point of tangency of the stylus from end to end of the sound track.

7. A tone arm assembly for a phonograph turntable comprising, a fixed arm S, a pair of arms B and D pivoted to the opposite ends of arm C, a tone arm supporting a stylus equipped pick-up at one end and pivotally connected to the outer ends of arms B and D and wherein arm B is connected to the tone arm at the end thereof remote from the stylus and arm D is connected to an intermediate portion of the tone arm and so as to divide the tone arm into a short arm A located between the pivot connections with arms B and D and a long arm E located between the stylus tip and the pivot connection with arm D, and wherein the ratio of the length of arm A to arm B is 0.7619; the ratio of the length of arm A to arm C is 1.4440; the ratio of the length of arm A to arm D is 0.8000; and the ratio of the length of arm A to arm E is 0.3555, said fixed arm C being adapted to be anchored outwardly of the turntable rim with its center line lying at an angle of 137 degrees 20 minutes plus or minus 5 minutes to a line passing through the turntable axis and the adjacent end of said arm C and said tone arm assembly being operable to maintain the tip of said stylus tangential to a sound track of a record on said tuntable while said stylus advances along the full length of said soundtrack.

8. A tone arm assembly as defined in claim 7 characterized in that the ratio of the length of arm A to the distance between the turntable axis and the pivot axis of arms C and D is approximately 3.79 inches.

9. A tone arm assembly as defined in claim 7 characterized in the provision of adjustable spring motor means having a driving connection to said tone arm means and effective to urge said tone arm to swing toward the turntable axis in a horizontal plane across the sound track of a record mounted on a turntable with a force substantially equal to the friction loss between said tone arm and its pivot connections with said fixed support therefor.

10. A tone arm assembly for a phonograph turntable having a fixed pivot support near the rim of the turntable, stylus-carrying rigid tone arm means pivotally supported on said pivot support for movement in a plane parallel to the surface of the turntable, servo spring motor means connected between said pivot support and a part of said tone arm close to its pivot connection with said pivot support and urging the outer remote end of said tone arm toward the center of said turntable with a force corresponding to the pivot friction losses of said tone arm and the friction pressure losses between the stylus on said tone arm means and the soundtrack, and means for precisely adjusting the effective force applied by said servo spring motor means to said tone arm means.

11. A tone arm assembly as defined in claim 10 characterized in that said tone arm means includes means for advancing the stylus-carrying end thereof longitudinally of a sound track groove as the last mentioned end of the tone arm swings toward the center of the turntable, and said servo spring motor means being effective to urge said stylus-carrying end of said tone arm means forward along the sound track groove and inwardly toward the center of the turntable by minute increments during each revolution of a record supported on the turntable.

12. A tone arm and phonograph turntable assembly comprising, a rotary turntable for supporting a record disc having a spiral sound track groove thereon, pivoting tone arm mechanism supported near the rim of said turntable and having a sound transducer equipped with a stylus positioned to seat in the record sound track groove, said tone arm mechanism including means operable to maintain the tip of the stylus in contact with the sound track groove at the point of tangency from end to end of said sound track and to advance the stylus through a minute increment forwardly along the sound track groove during each full revolution of the record, and adjustable servo spring motor means operatively connected to said tone arm mechanism and cooperating with the drag of the rotating record on the stylus tip to provide the energy to advance said tone arm mechanism and said stylus through said minute increments and to maintain the stylus tip at said point of tangency.

13. A tone arm assembly for a phonograph turntable having a record thereon, said assembly comprising a sound transducer having a stylus movably supported thereon with its tip disposed to seat lightly in the groove of a phonograph record sound track for activation thereby as the record rotates, means movably supporting said transducer for movement crosswise of a record having a continuous spirally-arranged sound track thereon, and adjustable servo spring motor means operatively connected to said transducer support means and effective to urge said transducer and the movable support means therefor toward the axis of rotation of the record and of the sound track thereon with a force corresponding to the friction losses between the relatively moving parts of said tone arm assembly and the friction pressure losses between said stylus and the sound track groove whereby said transducer and stylus follows the sound track with a minimum of pressure applied to hold the stylus in the sound track groove.

14. A unitary tone arm assembly adapted to be anchored beside the edge of a record turntable, said unitary assembly comprising a four bar linkage of pivotally connected links one link of which includes a tone arm having a stylus-equipped end adapted to extend over a turntable, said linkage including a stationary link on the side thereof remote from said tone arm and having its center line adapted to lie at an angle of 137 degrees 20 minutes plus or minus 5 minutes relative to a line passing through a turntable axis and the pivot at one end of said fixed link, said tone arm and the links of said four bar linkage comprising a fixed arm C, a pair of arms B and D pivoted to the opposite ends of arm C, a tone arm supporting a stylus equipped pick-up at one end and pivotally connected to the outer ends of arms B and D and wherein arm B is connected to the tone arm at the end thereof remote from the stylus and arm D is connected to an intermediate portion of the tone arm and so as to divide the tone arm into a short arm A located between the pivot connections with arms B and D and a long arm E located between the stylus tip and the pivot connection with arm D, and wherein the ratio of the length of arm A to arm B is 0.7619; the ratio of the length of arm A to arm C is 1.4440; the ratio of the length of arm A to arm D is 0.8000; and the ratio of the length of arm A to arm E is 0.3555 whereby said stylus tip is free to oscillate in a vertical radial plane passing through the turntable axis as the stylus advances over the full length of a soundtrack of a record carried by the turntable.

15. In a phonograph tone arm assembly having a tone arm pivotable about a stationary pivot axis and having clamping means on the outer end of the tone arm for clamping stylus-equipped transducer means in different positions lengthwise thereof, that improvement which comprises: locator means adjacent the outer end of said tone arm adapted to seat a gage member, a gage member formed to seat snugly against said locator means and having stylus tip locator means thereon positioned precisely a predetermined distance from said stationary pivot axis when said gage member is properly seated against said locator means and enabling the user to determine the precise proper assembly position for the transducer means before clamping the transducer means rigidly assembled to said tone arm.

16. The combination defined in claim 15 characterized in the provision of resilient vibration absorbing gasket means adapted to be sandwiched between the transducer means and the outer end of said tone arm.

17. A tone arm assembly for a phonograph turntable having a fixed support near the rim of the turntable, rigid tone arm means pivotally supported on said fixed support for pivotal movement in a plane generally parallel to and above the turntable, a relatively short stylus-supporting arm pivoted to the outer end of said tone arm means for limited movement about and axis parallel to said turntable, an adjustable counterbalance means carried by said pivoted stylus-supporting arm and including calibrated scale means, said counterbalance means being manually adjustable to vary the unbalanced weight acting to hold the stylus seated in the sound track groove of a record on the turntable under a pressure visually readable from said calibrated scale means, further characterized in that the outer end of said tone arm means includes means for clamping a stylus and an associated transducer means in different assembly positions lengthwise of said tone arm means with the tip of the stylus spaced different distances from the pivot axis of said tone arm means, locator means on the outer end of said tone arm means in axial alignment with the pivot axis of said stylus-supporting arm, a gage member being notched to seat snugly over said locator means, said gage member having stylus tip locator means thereon disposed to lie opposite the stylus tip when said transducer means is located in a proper clamping position with the stylus tip spaced precisely at the desired distance from the pivot axis of said tone arm means.

18. A tone arm assembly as defined in claim 17 characterized in that said gage member is channel-shaped and sized to embrace the outer end of said tone arm means from the lower side thereof with the web portion thereof positioned directly beneath the stylus tip, and the side flanges of said channel shaped gage member being notched to seat snugly about said locator means on the outer end of said tone arm means.

References Cited

UNITED STATES PATENTS

| | | | |
|---|---|---|---|
| 1,866,403 | 7/1932 | Elmer | 274—23 |
| 2,052,506 | 8/1936 | Volk | 274—23.1 |
| 2,455,529 | 12/1948 | Shortt | 274—23.1 |
| 2,510,342 | 6/1950 | Kilgour | 274—24 |
| 2,517,423 | 8/1950 | Gillmor | 274—24 |
| 2,603,490 | 7/1952 | Baker | 274—23.1 |
| 2,819,087 | 1/1958 | Cerone | 274—23 |
| 2,983,516 | 5/1961 | Bauer et al. | 274—23 |
| 3,042,412 | 7/1962 | Borthayre | 274—23 |
| 3,088,742 | 5/1963 | Alexandrovich | 274—23 |
| 2,060,117 | 11/1936 | Proctor | 274—23 X |
| 2,587,529 | 2/1952 | Rockwell | 274—23 |
| 2,937,877 | 5/1960 | Lange | 274—23.1 |
| 3,156,472 | 11/1964 | Brock | 274—23 |
| 3,294,403 | 12/1966 | Reed et al. | 274—23 |

FOREIGN PATENTS

| | | |
|---|---|---|
| 322,663 | 12/1929 | Great Britain. |
| 528,527 | 8/1941 | Great Britain. |
| 968,833 | 9/1964 | Great Britain. |

HARRY N. HAROIAN, Primary Examiner